Oct. 16, 1956   R. R. YOERGER   2,766,795
METHOD OF SEGMENTING CORNCOBS
Filed Jan. 19, 1953   2 Sheets-Sheet 1

INVENTOR:
Roger R. Yoerger,
BY Dawson, Tilton & Graham,
ATTORNEYS.

Oct. 16, 1956   R. R. YOERGER   2,766,795
METHOD OF SEGMENTING CORNCOBS
Filed Jan. 19, 1953   2 Sheets-Sheet 2
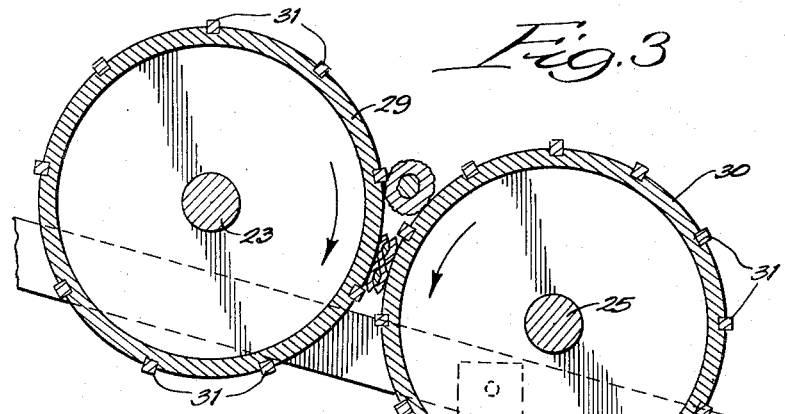
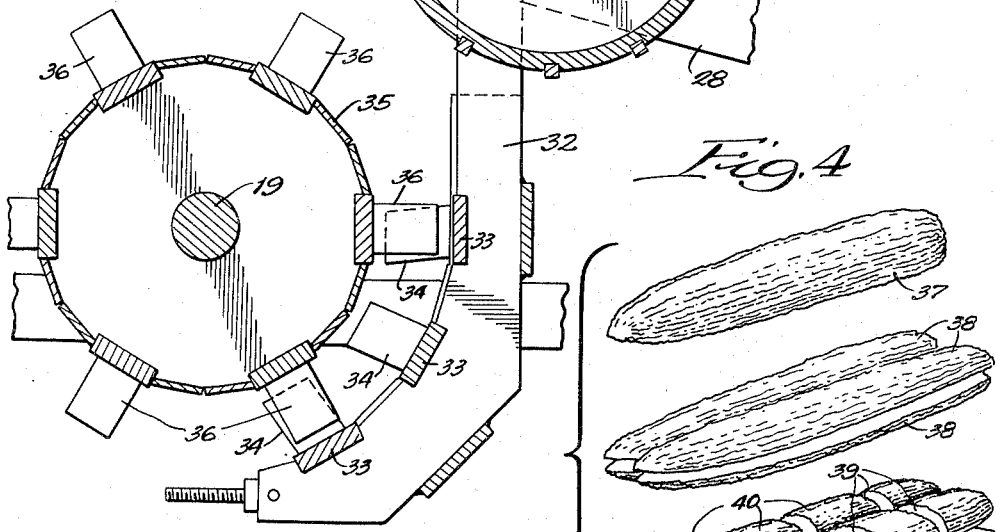
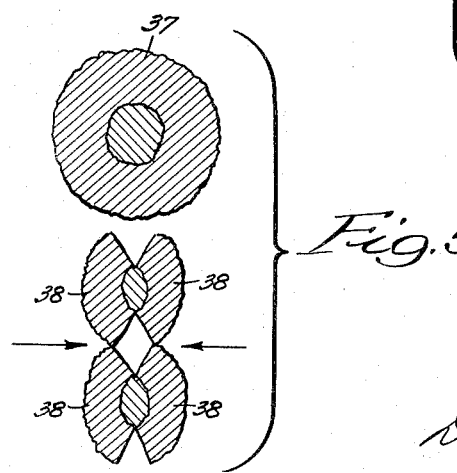
INVENTOR:
Roger R. Yoerger,
BY
Dawson, Tilton & Graham,
ATTORNEYS.

2,766,795
METHOD OF SEGMENTING CORNCOBS

Roger R. Yoerger, Ames, Iowa, assignor to Iowa State College Research Foundation, Inc., Ames, Iowa, a corporation of Iowa Application January 19, 1953, Serial No. 331,780

4 Claims. (Cl. 146—239)

This invention relates to a crusher device, and more particularly to a crusher adapted to crush corncobs, etc. for the forming of a stock or poultry litter and other products.

In the crushing of corncobs, etc. with mechanisms now available, it is found that a very substantial amount of dust is formed, which dust is not only undesirable in the handling and transporting of the product, but also, when the same is delivered and placed within a stock or poultry building. Further, the dust itself is largely lost and becomes ineffective as a litter. The devices now available for treating corncobs also are of sharply limited capacity, and efforts to operate such devices at a higher speed result in a greater formation of dust.

An object of the present invention is to provide a machine for crushing corncobs, etc. in such a manner as to avoid dust formation while at the same time producing corncob segments which are usable as an effective litter quantitatively. A further object is to provide mechanism in which corncobs are split first in longitudinal segments and then cut transversely to produce sizable chunks or pieces of corncob having relatively no dust therein and which are employed as an entirety in the forming of litter. A still further object is to provide an adjustable mechanism effective for separating corncobs into long segments while at the same time delivering the segments automatically to a desired destination and in substantially uniform pieces. A still further object is to provide mechanism for carrying corncobs to a zone in which the cobs are broken into substantially uniform segments while delivering the segments therefrom to a desired destination. A still further object is to provide a method and means for breaking corncobs into sizable and relatively uniform chunks highly desirable for litter while substantially eliminating the formation of dust. Other specific objects and advantages will appear as the specification proceeds.

The invention is shown, in an illustrative embodiment, by the accompanying drawings, in which—

Figure 1:
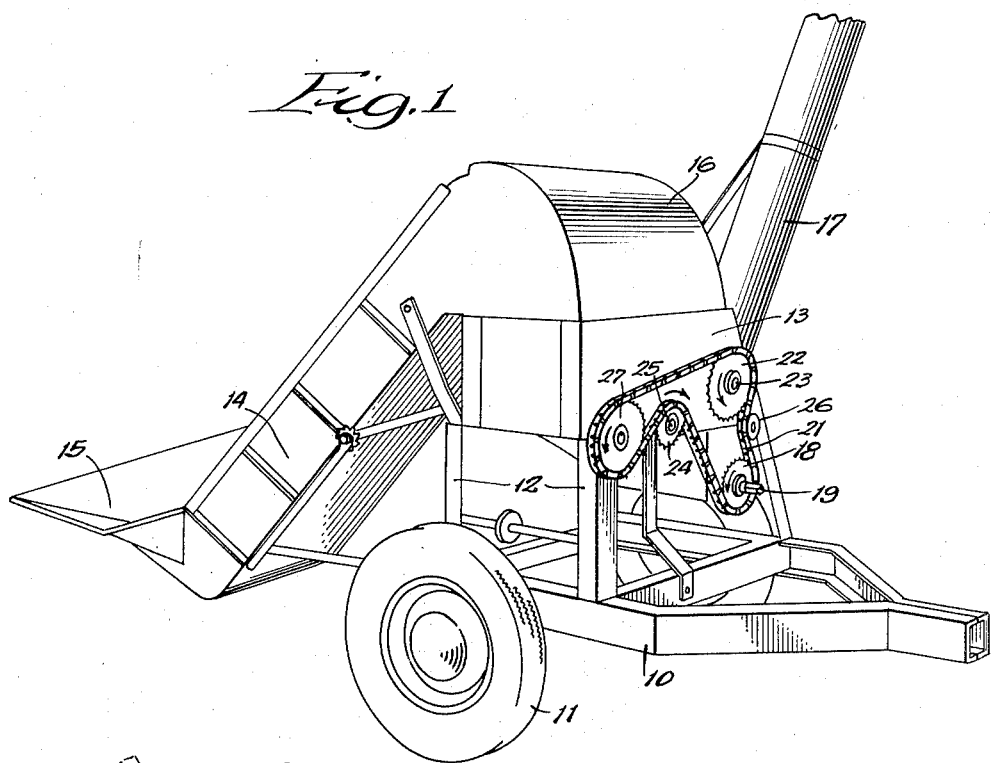
Figure 2:
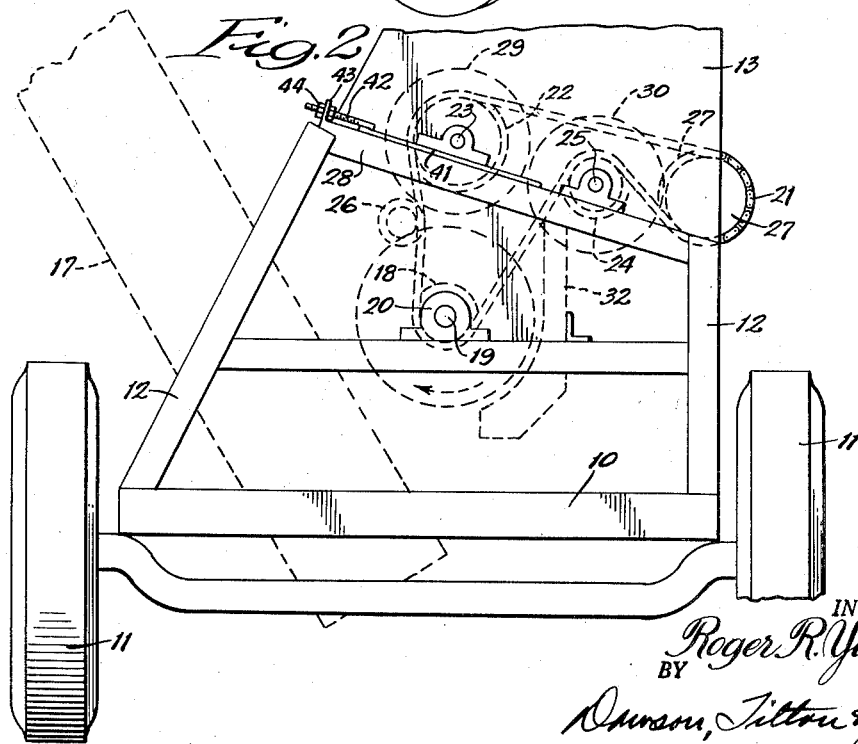

Figure 1 is a perspective view of a mechanism embodying my invention; Fig. 2, a rear view in elevation showing a portion of the mechanism in dotted lines; Fig. 3, an enlarged sectional enlarged view, showing the crushing rollers and cutting blades in cooperating relation; Fig. 4, a perspective view showing the changes in the corncob as it passes through the mechanism shown in Fig. 3; and Fig. 5, transverse sectional views showing the corncob prior to and after the crushing step.

I have discovered that corncobs may be quickly and effectively broken into relatively uniform segments by passing the corncobs through breaker or crushing rollers by which the cob is split longitudinally into four parts and the split cob portions then subjected to transverse cutting, as illustrated more clearly in Figs. 3 and 4. It will be obvious that the method may be carried out in a number of different forms of apparatus. I prefer, however, to use the crusher as shown in the drawings because of important advantages achieved by this apparatus.

In the illustration given in Figs. 1 to 3, 10 designates a frame carried upon wheels 11. Standards 12 extend upwardly from the frame 10 and support a casing 13 at a spaced distance above the trailer frame 10. A conveyor 14 equipped with a flared mouth portion 15 is adapted to carry corncobs from the inlet 15 upwardly and through an apron casing 16 and deposit the cobs within the crusher roller casing 13. A second conduit 17 is arranged to receive the crushed cobs and to carry them upwardly to a truck bin or other receiver. Since conventional elevators may be used for the elevator structures 14 and 17 shown in the drawing, it is believed unnecessary to describe the structures 14 and 17 in detail herein.

As shown more clearly in Figs. 1 and 2, a drive sprocket 18 mounted upon a shaft 19 is supported upon the frame 12 by means of bearings 20. The end of the shaft 19 is connected by a coupler (not shown) to a power take-off shaft of a tractor (not shown), or of any other suitable source of power. A chain 21 connects a sprocket 22 mounted upon the crusher roller shaft 23 and it also connects the sprocket 24 mounted upon the crusher roller shaft 25. I provide movable idler sprockets 26 and 27 so that by the movement of the idler sprockets or gears 26 and 27, the relative position of the bars 31, on roller 29, can be changed with respect to those on roller 30, thereby preventing interference between the bars 31 on rollers 29 and 30 while rotating at different speeds.

Frame 12 is provided at its top with inclined rails 28, on which are mounted the crusher rollers 29 and 30.

The relative positions of rollers 29 and 30 may be changed by the shifting of the idler sprockets 26 and 27 shown in Fig. 1. I prefer to drive the roller 29 faster than the roller 30, and preferably at a speed ratio of four to three. As the conveyor 14 brings the corncobs upwardly and discharges them through the casing 16 onto the rollers 29 and 30, the difference in speed ratio causes the corncobs to be readily aligned between the rollers, and with the cobs lined up horizontally, an effective quartering of the cobs is brought about. A fair quartering of the cobs is accomplished without the difference in speed ratios and the inclined arrangement of the rollers. I prefer, however, to have the inclined arrangement of rollers 29 and 30, as shown in Fig. 3, and to rotate roller 29 faster than roller 30 so as to bring about a quick alignment of the cobs and a crushing operation which facilitates the quartering action. Each of the rollers 29 and 30 is provided with crossbars 31, which aid in the splitting of the cobs longitudinally.

It will be understood that any elevating device may be employed. In the specific structures shown, the elevator 14 may be of the belt and flight type and the pipe elevator 17 may be equipped with a spiral screw for the raising of the cob pieces into the truck bed or other form of container, bin, etc.

Extending below the roller 30 and forwardly thereof, is a chute 32 which directs the corncob pieces forwardly and delivers them into the lower portion of the machine, forming an inlet for the screw conveyor 17. The chute 32 is provided with transverse supports 33 and carrying spaced teeth 34. Adjacent the chute 32 is a cutter roller 35 provided with spaced cutter blades 36. The cutter blades 36, as the roller 35 is rotated, pass through spaced teeth 34 on the chute 32 and cut the quartered cobs transversely as indicated in the lower sketch of Fig. 4. As indicated in Fig. 4, the original cob 37 is crushed to form the quartered longitudinal segments 38, and the quartered segments 38 are then cut transversely, as indicated at 39. Thus, in the two operations described, the original cob is quartered and then the quartered portions are cut transversely to form relatively uniform chunks 40 which fall into the lower portion of the machine adjacent the inlet to conveyor 17 and are then carried up by the conveyor 17 to a storage container, etc. As above indicated, the shaft 19 on which roller 35 is supported may be coupled directly to the power take-off of the tractor and the crusher rollers are then driven directly from a pulley mounted on shaft 19 by means of a belt which engages the sprockets mounted on shafts 23 and 25.

Any suitable means for adjusting the roller 29 closer to or farther from the roller 30 may be employed. In the specific illustration given in Fig. 2, a slide 41 carries the bearing for the shaft 23, and the slide is adjustable by means of a screw 42 anchored to the slide 41 and threadably engaging a fixed bracket 43. A nut 44 may be employed for advancing or retracting the slide 40 at each end of the frame member 28.

Operation

In the operation of the apparatus, the wheel-equipped machine is moved to a point where the entrance 17 of the elevator 11 is adjacent a pile of cobs. The cobs, as they are fed to the elevator 14, are carried up and deposited into the casing 16 over the V-shaped area between rollers 29 and 30. By reason of the inclination shown and the speed ratio between rollers 30 and 29, the cobs are quickly aligned longitudinally of the rollers 29 and 30. As the cobs are carried between the rollers, as shown in Fig. 3, a quartering action takes place, as indicated in Fig. 5. The cob sections then fall upon the cutter device below and the blades 34 and 36 sever the cobs as indicated at the bottom of Fig. 4. The segmented parts then fall into the inlet of the conveyor 17 near the bottom of the machine and the screw conveyor 17 carries the segments upwardly and into a truck, bin, or other container.

In the foregoing operation, substantially no dust is formed, the quartering being effected by the pressure of the two rollers and the bars 31 carried thereby, the quartered cobs being then cut to form segments of each quarter.

The segments formed may be varied as desired by adjusting the parts. Ordinarily, however, the segments as indicated in the drawing are highly effective in the forming of litter, also such segments are of a desirable size and uniformity for use in an extraction operation as, for example, extraction for the production of furfural, etc. In the specific illustration given, the final size of each corncob segment varies from ¾ inch to 1½ inch and is effective for absorbing 200% to 300% of its own dry weight in moisture. While this size is particularly desirable for use in a litter, the sizes may be varied widely for different uses.

I find that dust is largely avoided by the sequence of steps in that the quartering of the cob is accomplished by a pressure operation slitting the cob into the quarters indicated and then in the cutting operation, the greatly weakened quarters of the cob severing or breaking easily without the forming of dust. By moving one or both of the idler gears or sprockets, the speed ratio can be readily changed. The inclination of the bearings toward the crushing rollers is approximately 15°. Such angle, however, may be modified when different sized cobs are being crushed so as to effectively line up the cobs horizontally.

The chute 32 is effective as a support for holding the stationary teeth 34 in spaced relation with the teeth of the cutter roller 35 while at the same time the chute directs the cob fragments into the lower portion of the helical elevator 17.

While, in the foregoing specification, I have shown a specific structure in considerable detail for the purpose of illustrating an embodiment of the invention, it will be understood that such details of structure may be varied widely by those skilled in the art without departing from the spirit of my invention.

I claim:

1. In a method for breaking cobs into segments without substantial formation of dust, the steps of pressing each cob along the sides thereof to fracture it into longitudinal segments, and transversely striking the longitudinal segments to break them transversely.

2. In a process for segmenting corncobs, the steps of pressing a cob between opposed forces to split the corncob into four quarters, and striking the quartered segments transversely to break them into smaller segments.

3. In a process for segmenting corncobs, the steps of passing corncobs between opposed forces having magnitudes to effect a quartering of each cob longitudinally, and then cutting the quartered cob transversely thereof to form segments.

4. In a method of segmenting corn cobs to form litter material, the steps of pressing the cob along longitudinally extending lines at the surface thereof, the lines being at generally opposite positions along the cob, increasing the magnitude of the pressing forces applied to break the cob into quarters, and thereafter severing the quartered cob transversely to provide segments of relatively uniform size.

References Cited in the file of this patent

UNITED STATES PATENTS

| | | |
|---|---|---|
| 136,321 | Harvey | Feb. 25, 1873 |
| 429,794 | Poindexter | June 10, 1890 |
| 569,821 | Dickson | Oct. 20, 1896 |
| 842,681 | Mayne | Jan. 29, 1907 |
| 1,074,844 | Dellinger | Oct. 7, 1913 |
| 1,724,072 | Daniels | Aug. 13, 1929 |
| 1,749,925 | Schaefer | Mar. 11, 1930 |
| 1,750,941 | Pardee | Mar. 18, 1930 |
| 2,144,841 | Glaser | Jan. 24, 1939 |
| 2,345,779 | Wagner | Apr. 4, 1944 |
| 2,481,201 | Collier | Sept. 6, 1949 |
| 2,562,282 | Nickle et al. | July 31, 1951 |
| 2,566,721 | Dunbar | Sept. 4, 1951 |

FOREIGN PATENTS

| | | |
|---|---|---|
| 224,903 | France | Oct. 12, 1892 |